United States Patent Office 3,346,586
Patented Oct. 10, 1967

3,346,586
PRODUCTION OF N-VINYL 2-OXAZOLIDONES
Richard Frederick James Ingleby, 52 Ram Gorse, Harlow, England
No Drawing. Filed Oct. 14, 1960, Ser. No. 62,547
Claims priority, application Great Britain, Mar. 9, 1960, 8,362/60
12 Claims. (Cl. 260—307)

This invention relates to the production of N-vinyl 2-oxazolidones.

The N-vinyl 2-oxazolidones made by the method of the present invention have the general formula:

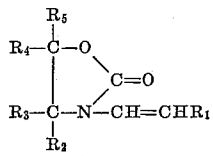

in which $R_1$, $R_2$, $R_3$, $R_4$ and $R_5$ may be the same or different and may be a hydrogen atom, or an alkyl, aryl or aralkyl radical.

According to the invention there is provided a method of making an N-vinyl 2-oxazolidone, wherein an oxazolidone-aldehyde condensation product of the formula:

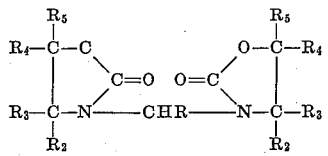

in which R is a primary or secondary alkyl radical, and in which $R_2$, $R_3$, $R_4$ and $R_5$, may be the same or different and may be a hydrogen atom, or an alkyl, aryl or aralkyl radical, is decomposed by heat at reduced pressure either alone or in the presence of an acid catalyst to give a 2-oxazolidone and an N-vinyl 2-oxazolidone, and wherein the reaction products are removed from the reaction mixture and separated from one another. The oxazolidone-aldehyde condensation product may be prepared by the method described in the specification of our co-pending U.S. patent application 58,882, filed Sept. 28, 1960, and now abandoned.

It has been found that if the decomposition of the oxazolidone-aldehyde condensation product is carried out at low pressure, preferably below 100 mm. Hg, by heating the material alone or in the presence of a strong acid (which includes the so-called "Lewis acids," for example aluminum trichloride), the primary products of the decomposition, being of lower molecular weight than that of the starting material, may be distilled from the mixture of starting material and acid in good yield. These primary decomposition products are 2-oxazolidone (or the substituted 2-oxazolidone from which the original condensation product was made) and N-vinyl 2-oxazolidone (or the corresponding N-vinyl substituted 2-oxazolidone) if acetaldehyde was the aldehyde used in the preparation of the original condensation product, or the corresponding N-(β-substituted vinyl) 2-oxazolidone if an aldehyde with the structure $R_6R_7CH$—CHO was used in the preparation of the original condensation product. If the primary products of decomposition are allowed to remain in the heated region, further decomposition and reaction to intractable resinous materials takes place. Furthermore, contact with acid at lower temperatures brings about recombination of the primary products to yield starting material again. For these reasons, it is necessary to remove the primary products rapidly from the heated mixture and, if a catalyst is employed, to use an acid of low volatility.

In the case of heating the condensation product of 2-oxazolidone and acetaldehyde in the presence of a "Lewis acid" the reaction proceeds as shown by the formula:

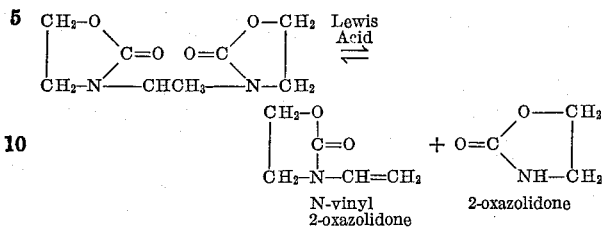

It is well-known that 2-oxazolidone (and 2-oxazolidones in general) react with acids such as, for example, concentrated sulphuric acid or phosphoric acid, or hydrogen chloride, to give β-substituted ethylamine salts and carbon dioxide.

This reaction is undesirable in the present context, since it leads to loss both of the acid catalyst and of 2-oxazolidone. It is found that the addition of materials of the "Lewis acid" type, such as zinc chloride, does not accelerate the production of carbon dioxide from 2-oxazolidone upon heating, indicating that such materials do not react in this way and do not catalyse the decomposition of 2-oxazolidone to ethylenimine or polymers thereof. On the other hand, such materials facilitate the thermal decomposition of the 2-oxazolidone-aldehyde condensation products, increasing at any temperature the rate of formation of the primary products of decomposition, and, also, that of secondary decomposition, relative to the rates in the absence of catalyst.

Accordingly, it is preferred to use a "Lewis acid" for the acid catalysis. The material chosen should be soluble in the fused condensation product and should have a low vapour pressure at temperatures up to 300° C. Zinc chloride is a suitable material.

The zinc chloride (or other "Lewis acid") may be thought of as catalysing the reactions leading to the establishment of equilibrium between the condensation product and the primary products of decomposition. This equilibrium is disturbed either by the further decomposition of the vinyl and other materials or by the removal of the relatively volatile primary products of decomposition by distillation from the mixture, leading to the eventual total disappearance of the starting material.

The amount of catalyst required is generally between 0.05 and 5% by weight of starting material. It is desirable that the mixture should be heated at 200–300° C. under vacuum, and the products distilled out and condensed. They form on cooling, a semi-solid mass of crystals of 2-oxazolidone in the liquid N-vinyl 2-oxazolidone. Most of the N-vinyl 2-oxazolidone may be removed by washing with benzene or another poor solvent for 2-oxazolidone. The solvent is removed and the N-vinyl 2-oxazolidone is further purified by fractional distillation under vacuum.

The acid catalyst may be added to the starting material and the mixture heated up under high vacuum, or the starting material may be added slowly under vacuum in the liquid state to the heated acid catalyst, or the starting material, vaporised at low pressure, may be passed through a heated bed of the acid catalyst which may be carried on, for example, charcoal, silica gel, or pumice.

Furthermore, the mixture of acid catalyst and starting material does not decompose very quickly at temperatures just above its melting point, so that a molten mixture of starting material and acid catalyst may be admitted to and passed quickly through a heated zone where the decomposition takes place, and from which the primary products of decomposition are removed as soon as formed by distillation at reduced pressure. One particular advantage of this mode of operation is that secondary decomposition is greatly reduced because of the short period of heating. It has also been found that most of the secondary decomposition that takes place when the process is carried out batchwise occurs towards the end of the run, when the acid catalyst concentration relative to starting material remaining is increasing rapidly. Thus undesired modes of decomposition are minimized by allowing the primary decomposition to go only to low conversion, with an appreciable fraction of the starting material originally taken remaining at the end of the run. Fresh starting material may be added to the mixture of acid catalyst and unconverted material, and the whole used as the charge for the next run. The advantages of carrying the reaction to low conversion may be obtained in the batch process or in the method of continuous passage of material and acid catalyst through a heated zone.

The acid catalyst may be dissolved in fused 2-oxazolidone before the addition of 2-oxazolidone-aldehyde condensation product, with the advantages that excessive local catalyst concentrations are avoided and the melting point of the mixture is reduced. These advantages are particularly important when the method of flowing the mixture through a heated zone is employed.

It has been discovered that the presence of finely divided copper in the heated mixture does not accelerate the primary decomposition, but inhibits the secondary decomposition. The copper may be produced in situ by the addition to the mixture of starting materials of copper compounds such as cupric acetate, or may be added as copper powder. The copper does not entirely prevent further decomposition if zinc chloride is used, but is very effective in its absence.

It is particularly useful, therefore, as an additive when the 2-oxazolidone aldehyde condensation product is being decomposed in the absence of zinc chloride or other catalyst, or when the condensation product is first vaporized and then passed through a heated bed of acid catalyst, or through a hotter region to ensure complete primary decomposition if an acid catalyst is not employed.

The invention will now be illustrated by the following examples.

*Example 1*

150 g. 3,3′-bis (2-oxazolidonyl)methyl methane (2-oxazolidone/acetaldehyde condensation product) and 1.5 g. zinc chloride were heated over an oil bath at 250° C. in a flask fitted with a nitrogen bleed and connected to a receiver and cold trap by a condenser. A colourless distillate came over rapidly at a gauged pressure of 0.1 mm. Hg but after 30 minutes, the distillate became yellowish and almost ceased coming over. The pot residue was very dark, so heating was discontinued. The fluid residue cooled to 13.7 g. of a dark brittle foam. The 133.2 g. pale yellow distillate partially solidified, it was remelted and poured into 500 ml. boiling benzene, which was then cooled, when crystals were deposited. These were filtered off and dried, giving 75.0 g. colourless crystals, M.P.~100° C. The benzene was evaporated, yielding 57.1 g. of an orange oil, which, after addition of a trace of copper acetate as stabilizer, was distilled giving 38.4 g. N-vinyl 2-oxazolidone of 92.6% purity (as determined by iodine titration) and 16.5 g. crystalline residue. This corresponds to a 42% yield of N-vinyl 2-oxazolidone based on the original starting material, or 51% after allowance is made for the starting material present in the crystalline fractions recovered.

*Example 2*

A mixture of 150 g. 3,3′-bis (2-oxazolidonyl)methyl methane and 0.5 g. zinc chloride were heated together as in Example 1, but distillation was halted when about one third of the charge remained. After the flask had cooled and the pressure had been returned to atmospheric, a further 100 g. starting material and 0.1 g. zinc chloride were added, and the mixture heated as before. Again, distillation was halted and the flask cooled before all the starting material had reacted, and another 100 g. starting material and 0.1 g. zinc chloride were added. This time heating was continued until no further distillate was produced. Total distillate weighed 330 g. and there were 17.6 g. of a dark brittle residue. The distillate, which partially crystallised, was triturated twice with 500 ml. benzene and filtered, yielding 183.5 g. air-dried crystals. The benzene solution was evaporated yielding 152.2 g. of oil. Redistillation of this oil at 0.05–0.1 mm. Hg gave 96.4 g. of N-vinyl 2-oxazolidone, coming over at 60–70° C. and 34.5 g. crystalline residue. Iodine titration indicated 97% purity. This corresponds to a yield of 47.5% based on starting material, or 58.5% after allowance is made for starting material present in the crystalline fractions recovered.

*Example 3*

100 g. 3,3′-bis (2-oxazolidonyl)methyl methane (2-oxazolidone/acetaldehyde condensation product) and 5 g. copper powder were heated with a free flame in a flask fitted with an air condenser and gas inlet capillary tube under a pressure of 43–50 mm. Hg of nitrogen. The material melted at about 160° C., and started to boil at about 250° C. The distillate came over at 185–202° C., and was initially water-white. After 30 minutes, the rate of distillation dropped off, and the material started coming over a pale yellow colour, so heating was discontinued. The distillate, 70 g. of a pale yellow liquid, crystallized partially on standing, and the flask residues crystallized on being allowed to cool. The material in the flask was taken up in about 350 ml. hot methanol, and filtered, using charcoal and filter aid to remove the copper. The brown methanolic solution was concentrated, and cooled, yielding a first crop of recovered starting material (slightly discoloured) weighing 16.2 g., M.P. 150–153° C. A second crop of 4.4 g. M.P. 148–150° C. was obtained on further concentration of the mother liquors. The residual mother liquors yielded 8.1 g. tar on evaporation.

The distillate was twice triturated with 175 ml. benzene and filtered, yielding 25.0 g. air-dried crystals of 2-oxazolidone. The benzene solution was evaporated, giving 45.6 g. of an oil, which on redistillation, gave 30.6 g. N-vinyl 2-oxazolidone, B.P. 70° C./0.1 mm. Hg of 96.6% purity, as determined by iodine titration and a residue of 10.4 g. crude 2-oxazolidone. This corresponds to a 66% yield of N-vinyl 2-oxazolidone based on unrecovered starting material. The recovery of 2-oxazolidone was practically quantitative.

*Example 4*

6 g. 3,3′-bis (2-oxazolidonyl)ethyl methane (2-oxazolidone/propionaldehyde condensation product) and 1 g. copper powder were heated with a small free flame in a small flask fitted directly into a receiver. 5.1 g. of a colourless distillate coming over at 200–240° C./ 40 mm, Hg were obtained. The residue in the pot crystallized on being allowed to cool. The distillate (which partially crystallized) contained large amounts of an unsaturated material as demonstrated by a strongly positive bromine water test. The distillate was a mixture of 2-oxazolidone and N-propenyl 2-oxazolidone, together with traces of starting material.

*Example 5*

6 g. 3,3′-bis (5-methyl 2-oxazolidonyl)methyl methane (5 - methyl 2 - oxazolidone/acetaldehyde condensation product) and 1 g. copper powder were heated as in Example 4. 4.8 g. of a distillate, coming over at 260° C./38 mm. Hg were obtained. It rapidly solidified to a hard mass of white crystals which had a melting point of over 100° C. Little unsaturated material was present, as shown by only a weak response to the bromine water test. The pot residue also crystallized. It was concluded that the starting material had distilled over almost unchanged.

Example 6

The distillate from the previous example was replaced in the flask with the residue, and the mixture reheated, this time under a pressure of 95 mm. Hg. A colourless distillate came over at 250–260° C. This partially crystallized to a pasty solid, the whole remelting below 100° C. A test with bromine water demonstrated the presence in it of large amounts of unsaturated material. The pot residue, even after this further heating, crystallized on cooling. The distillate was a mixture of N-vinyl 5-methyl 2-oxazolidone and 5-methyl 2-oxazolidone, together with traces of starting material.

Examples 7 to 18

The results of small-scale experiments illustrating the effect of various factors are tabulated below. In all cases, about 5 g. of 2-oxazolidone/acetaldehyde condensation product (3,3′-bis(2-oxazolidonyl)methyl methane, M.P. 152–155° C.) were heated with a free flame in a small Claisen flask, together with various additives. The amount of additives used was about 500 mg. in each case. The distillates usually crystallized fairly readily; about 40 ml. benzene were added and the precipitated crystalline material filtered off. In all cases, the benzene solution gave a positive test for unsaturation with bromine water, some tests giving a greater degree of unsaturation than the others as indicated by a ++ sign. In some cases, the dried crystalline material melted below 100° C., showing that there was a relatively large amount of 2-oxazolidone present. In others, the melting point was above 100° C., indicating the presence of a large amount of starting material. In a run carried out at 50 mm. Hg, the internal temperature ranged during the run from 260 to 280° C.

From the table it can be deduced that the rate of uncatalyzed thermal decomposition increases with temperature much faster than does the vapour pressure of the starting material, since to obtain high conversions it is necessary to operate at a pressure in excess of 50 mm. Hg, so that starting material does not distill unchanged.

selected from the group consisting of hydrogen, alkyl, aryl and aralkyl, to give a 2-oxazolidone and an N-vinyl 2-oxazolidone; removing the reaction products from the reaction mixture; and separating the reaction products from one another.

2. The method of claim 1, wherein the Lewis acid is soluble in the condensation product.

3. The method of claim 2, wherein the Lewis acid is zinc chloride.

4. The method of claim 1, wherein the acid catalyst is present in an amount between 0.5 and 5% by weight of the starting material.

5. A method of making an N-vinyl 2-oxazolidone, comprising the steps of decomposing at a temperature of between 200 and 300° C. in the presence of an acid catalyst in the form of a Lewis acid and at a pressure below 100 mm. Hg an oxazolidone-aldehyde condensation product of the formula:

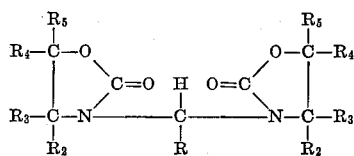

wherein R is selected from the group consisting of primary and secondary alkyl, and wherein $R_2$, $R_3$, $R_4$ and $R_5$ are selected from the group consisting of hydrogen, alkyl, aryl and aralkyl, to give a 2-oxazolidone and an N-vinyl 2-oxazolidone; distilling off the reaction products from the reaction mixture; condensing the reaction products; and separating the reaction products from one another.

6. The method of claim 1, wherein the Lewis acid catalyst is dissolved in fused 2-oxazolidone before the addition of the condensation product.

7. A method of making an N-vinyl 2-oxazolidone comprising the steps of vaporising at low pressure an oxazolidone-aldehyde condensation product of the formula:

| Example | Additive | Pressure, mm. Hg | Still-head temp., ° C. | Distillate | | | Residue |
|---|---|---|---|---|---|---|---|
| | | | | Colour | M.P. of crystals, ° C. | Unsaturation | |
| 7 | None | 760 | 280 | Rapidly decomposes to tar | | | |
| 8 | Copper powder | 760 | 280 | First drop colourless. | | + | Tarry. |
| 9 | None | 12–15 | 200 | Dark | | + | Do. |
| 10 | Copper powder | 12–15 | 200–240 | Light | >100 | + | Crystalline. |
| 11 | Copper powder plus Stearic acid. | 13 | 190–230 | Light green | >100 | + | Do. |
| 12 | Cupric oxide | 12–15 | 200–240 | Light | >100 | + | Do. |
| 13 | Copper acetate | 12–15 | 205–235 | Green | >100 | + | Do. |
| 14 | Zinc chloride | 12–15 | 175 | Light | <100 | ++ | Tarry. |
| 15 | Zinc chloride plus Copper acetate. | 12–15 | 190–195 | Green | <100 | ++ | Do. |
| 16 | Cupric oxide | 50 | 200–220 | Light | <100 | ++ | Crystalline. |
| 17 | Copper powder | 75 | 200–230 | ...do... | <100 | ++ | Do. |
| 18 | Cupric oxide | 80 | 240–260 | ...do... | <100 | ++ | Do. |

Having thus described the invention, what is claimed as new and desired to be secured by Letters Patent is:

1. A method of making an N-vinyl 2-oxazolidone, comprising the steps of decomposing by heat at reduced pressure in the presence of an acid catalyst in the form of a Lewis acid an oxazolidone-aldehyde condensation product of the formula:

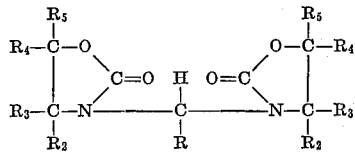

wherein R is selected from the group consisting of primary and secondary alkyl, and wherein $R_2$, $R_3$, $R_4$ and $R_5$ are

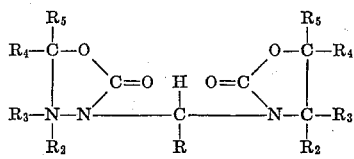

wherein R is selected from the group consisting of primary and secondary alkyl, and wherein $R_2$, $R_3$, $R_4$ and $R_5$ are selected from the group consisting of hydrogen, alkyl, aryl and aralkyl; passing the vaporised condensation product through a heated bed of an acid catalyst in the form of a Lewis acid on a carrier therefor to give a 2-oxazolidone and an N-vinyl 2-oxazolidone; condensing the resulting reaction products emerging from the reaction zone; and separating the reaction products from one another.

8. A method of making an N-vinyl 2-oxazolidone comprising the steps of admitting to and passing quickly through a heated zone where decomposition takes place, a molten mixture of an acid catalyst being a Lewis acid and an oxazolidone-aldehyde condensation product of the formula:

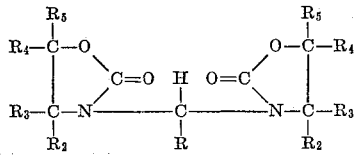

wherein R is selected from the group consisting of primary and secondary alkyl, and wherein $R_2$, $R_3$, $R_4$ and $R_5$ are selected from the group consisting of hydrogen, alkyl, aryl and aralkyl, to give a 2-oxazolidone and an N-vinyl 2-oxazolidone; condensing the reaction products emerging from the heated zone; and separating the reaction products from one another.

9. The method of claim 8, wherein the Lewis acid catalyst is dissolved in fused 2-oxazolidone before the addition of the condensation product.

10. A method of making an N-vinyl 2-oxazolidone, comprising the steps of decomposing by heat in the presence of finely divided copper and at a reduced pressure an oxazolidone-aldehyde condensation product of the formula:

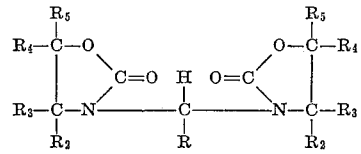

wherein R is selected from the group consisting of primary and secondary alkyl, and wherein $R_2$, $R_3$, $R_4$ and $R_5$ are selected from the group consisting of hydrogen, alkyl, aryl and aralkyl to give a 2-oxazolidone and an N-vinyl 2-oxazolidone; removing the reaction product from the reaction mixture; and separating the reaction products from one another.

11. The method of claim 10, wherein the copper is produced in situ by adding a copper compound to the condensation product.

12. Method for preparing N-vinyl-5-methyl-2-oxazolidinone and 5-methyl-2-oxazolidinone from N,N'-ethylidene-bis (5-methyl-2-oxazolidinone) by heating the latter in the presence of cupric oxide up to a temperature of 250° C. under reduced pressure to split the N,N'-ethylidene-bis (5-methyl-2-oxazolidinone) and to distill off N-vinyl-5-methyl-2-oxazolidinone and 5-methyl-2-oxazolidinone.

References Cited

UNITED STATES PATENTS 2,818,362 12/1957 Drechsel _____ 260—307.3
3,079,396 2/1963 Walles _____ 260—307

OTHER REFERENCES

Delaby et al.: Chem. Abstracts, vol. 50, col. 9382 (1956). Copy available in Sci. Library.

ALTON D. ROLLINS, *Primary Examiner.*

I. MARCUS, WALTER A. MODANCE, *Examiners.*

V. J. McCUTCHEN, *Assistant Examiner.*